United States Patent [19]
Levee

[11] Patent Number: 5,915,806
[45] Date of Patent: Jun. 29, 1999

[54] MULTI-FUNCTION SQUARE

[76] Inventor: Kevin M. Levee, 3505 Young Rd., Millers, Md. 21107

[21] Appl. No.: 08/656,854

[22] Filed: May 30, 1996

[51] Int. Cl.⁶ .................................................. B43L 13/02
[52] U.S. Cl. .................................................. 33/42; 33/468
[58] Field of Search .................... 33/42, 293, 465, 33/468, 469, 479, 480, 760; 359/3

[56] References Cited

U.S. PATENT DOCUMENTS

| | | | |
|---|---|---|---|
| Re. 27,496 | 10/1972 | Andrews | 33/760 |
| 530,111 | 12/1894 | Krebs | 33/480 |
| 2,741,030 | 4/1956 | Wise | 33/465 |
| 4,227,314 | 10/1980 | Schliep | 33/480 |
| 4,334,360 | 6/1982 | Burns et al. | 33/42 |
| 4,531,296 | 7/1985 | Veeze | 33/468 |
| 4,599,806 | 7/1986 | Wright | 33/469 |
| 4,700,489 | 10/1987 | Vasile | 33/480 |
| 4,837,717 | 6/1989 | Wiklund et al. | 356/3 |
| 4,922,621 | 5/1990 | Maier | 33/465 |

FOREIGN PATENT DOCUMENTS

| | | | |
|---|---|---|---|
| 62-90501 | 4/1987 | Japan | 33/760 |
| WO 94/09951 | 5/1994 | WIPO | 33/760 |

*Primary Examiner*—G. Bradley-Bennett
*Attorney, Agent, or Firm*—Scally, Scally & McMahon, P.A.; Richard M. McMahon

[57] ABSTRACT

The Mad Square invention has a detachable spring loaded marker device which accepts replaceable lead points and for which the pencil lead can be adjusted to the right length by tightening the adjusting screw. The detachable marking device can be slid along either of the two sides of the horizontal straight edge with ruler marks on each edge of the blade segment to conveniently draw the desired angle. The combination square has a rotatable straight edge which pivots from the corner joint to a 90° and 45° angle on each side of the horizontal position. Other angles may be selected and used with this device which has a protractor device to measure the precise angle of the blade. The straight edge can be rotated and locked in position to establish a precise pre-determined angle or can be used in determining the relative angle between two pre-determined points defined by the extensions of the pivotally attached blade and head of the carpentry square. The Mad Square Device also has a built-in retractable tape measure from which the tape is pulled out from the corner to accurately and efficiently measure rafters, joices, and similar applications. The tape measure bracket is affixed by a thumb screw to the head of the Mad Square Device and can be removed from one end of the head of the device and positioned at the opposite end of the head to receive the retractable tape measure, or, alternatively, an electronic distance meter.

15 Claims, 9 Drawing Sheets

MULTI-FUNCTION SQUARE

BACKGROUND OF THE INVENTION

This invention relates in general to the field of hand tools and more particularly, to a combination carpentry tool which combines a square, tape measure, a plurality of levels, and a marker device. This invention discloses a unique combination of known hand tools into a single multi-purpose carpentry tool which provides both a new and useful improvement in the field of carpentry hand tools.

Carpentry squares and other hand tools such as levels, tape measures, and devices for marking wood, plastic, dry wall, and other building materials have been used as separate individual hand tools. In the past, efforts to combine such tools were only partially successful. The new invention disclosed herein is a unique combination of such known plurality of hand tools into a single, easy to work with, carpentry tool which is both a new combination device and offers a distinct improvement in the field of conventional hand tools.

An object of this invention is to reduce the possibility of the user misplacing or losing the small tools such as the tape measure, plurality of levels and marker devices. The combination of these tools into a single carpentry tool is a distinct improvement over the prior art.

Still a further object of this invention is to provide an accurate measuring tool which does not shift or move easily on the material being marked, and a marker device which provides an easy accurate method of marking the correct measurement.

A further object of this invention is to have a straight edge of the length proper for large materials and shorter materials which can he achieved by removing and replacing the preferred embodiment straight edge blade with a blade of the proper length for the particular job.

An additional object of this invention is that the device can be used as a dividing tool for longitudinally dividing a piece of the material being worked on by the user. A further object of this invention is to accept replaceable lead points which reduces the cost of the marker device and simplifies replacement by using standard lead points extensively used by draftsmen and architects.

Historically, various hand tools have been combined and attempts have been made to combine the square and tape measure into a single combination tool so measurements can be made prior to cutting. A known device is disclosed in U.S. Pat. No. 4,237,314, U.S. Pat. No. 4,770,489, U.S. Pat. No. 5,077,910, and U.S. Pat. No. 5,077,910 which disclose a carpenter's squares in combination with measuring tapes. However, none of these disclosures depicts a device with a rotating angle straight edge that can be used to measure and mark various angles on surfaces.

U.S. Pat. No. 4,562,649 and U.S. Pat. No. 4,729,173 disclose rotatable straight edges as part of carpenter's squares which can be used to mark angles on the surfaces of large sheets but these disclosures do not include a marking device or levels as part of the combination tool.

Other combination hand tools contain some of the features of the present invention but do not disclose the unique combination or improvement to field of carpentry hand tools revealed by this invention. U.S. Pat. No. 5,481,810 depicts a combination tape measure and straight edge apparatus which is triangular in shape which permits the use of either the triangle or tape measure tool without interference when using either side of the triangle. This invention does not disclose a rotatable straight edge, level, or marker device.

Reissued U.S. Pat. No. RE 27,496 discloses a combination tool with a square, measuring tape, and level device. It does not reveal a rotatable straight edge or a marking device.

Other techniques of measuring angles use protractor devices as disclosed in U.S. Pat. No. 4,599,806 with a T-head member, a straight edge, and a rotatable protractor. However, this invention does not disclose either a level or a marker device in combination with the features disclosed.

Similarly, U.S. Pat. No. 5,239,761 discloses a combination instrument having a straight edge which serves a rule, an angular level for measuring any angle, and a measuring tape. However, this invention does not disclose a marker device in combination with the features disclosed.

Thus, the prior art does not teach nor suggest a combination device such as the present invention with the desirable features as a unique combination of a carpentry square, a rotating angle straight edge, a measuring tape, marker, and a plurality of level devices.

Other advantages of the present invention over the prior art will become better understood by reference to the following detailed description when considered in connection with the accompanying drawings.

SUMMARY OF THE INVENTION

In accordance with the present invention, the Mad Square Device is a new and useful improvement in the field of carpentry hand tools which is a combination of known hand tools into a single multipurpose device. The Mad Square invention has a carpenter's square, a rotatable angle straight edge, tape measure, level, and a marking device. The detachable slidable marking device has a spring-loaded marker which accept replaceable lead points, and the said marking device is slidablly attached to the rotatable angle straight edge. In another embodiment the detachable marking device can be replaced with a cutting blade device for use in cutting drywall and like materials. This invention includes a plurality of levels; one level is mounted on the slidable marking device component. Additional levels are flush mounted in each end of the Head or vertical straight edge segment of the device so that one of these two levels can be used at the end of the Head not occupied by the removable retractable tape measure. Each of the components of the present invention is removable for maintenance or replacement. Other embodiments of the present invention are achieved by replacing the fixed length rotatable straight edge with a longer or shorter rotatable horizontal straight edge, to fit the needs of the specific project. Yet another embodiment of this invention is to replace the retractable tape measure with an electronic distance meter.

The above description sets forth rather broadly the more important features of the present invention in order that the detailed description thereof that follows may be better understood, and in order that the present contributions to the art may be better appreciated. There are, of course, additional features of the invention that will be described herein after and which will be for the subject matter of claims appended thereto.

In this respect, before explaining a preferred embodiment of the invention in detail, it is understood that the invention is not limited in its application to the details of the construction and to the arrangements of the components set forth in the following description or illustrated in the drawings. This invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods and systems for carrying on the several purposes of the present invention. It is important therefore, that the claims be regarded as including such equivalent constructions insofar as they do not depart from the spirit and scope of the present invention.

It is therefore a specific purpose of the present invention to provide a new and improved hand tool which is a unique combination of a tape measure, a plurality of levels, a rotatable straight edge apparatus, and a slidable marking device which has all of the advantages of the prior art and none of the disadvantages.

DETAILED DESCRIPTION

Referring to the drawings for a better understanding of the present invention, this invention is susceptible to embodiment in several different forms, the description which follows should be viewed as an illustration of the principles of the invention and is not intended to limit the two specific embodiments illustrated in the drawings.

Figure 1:
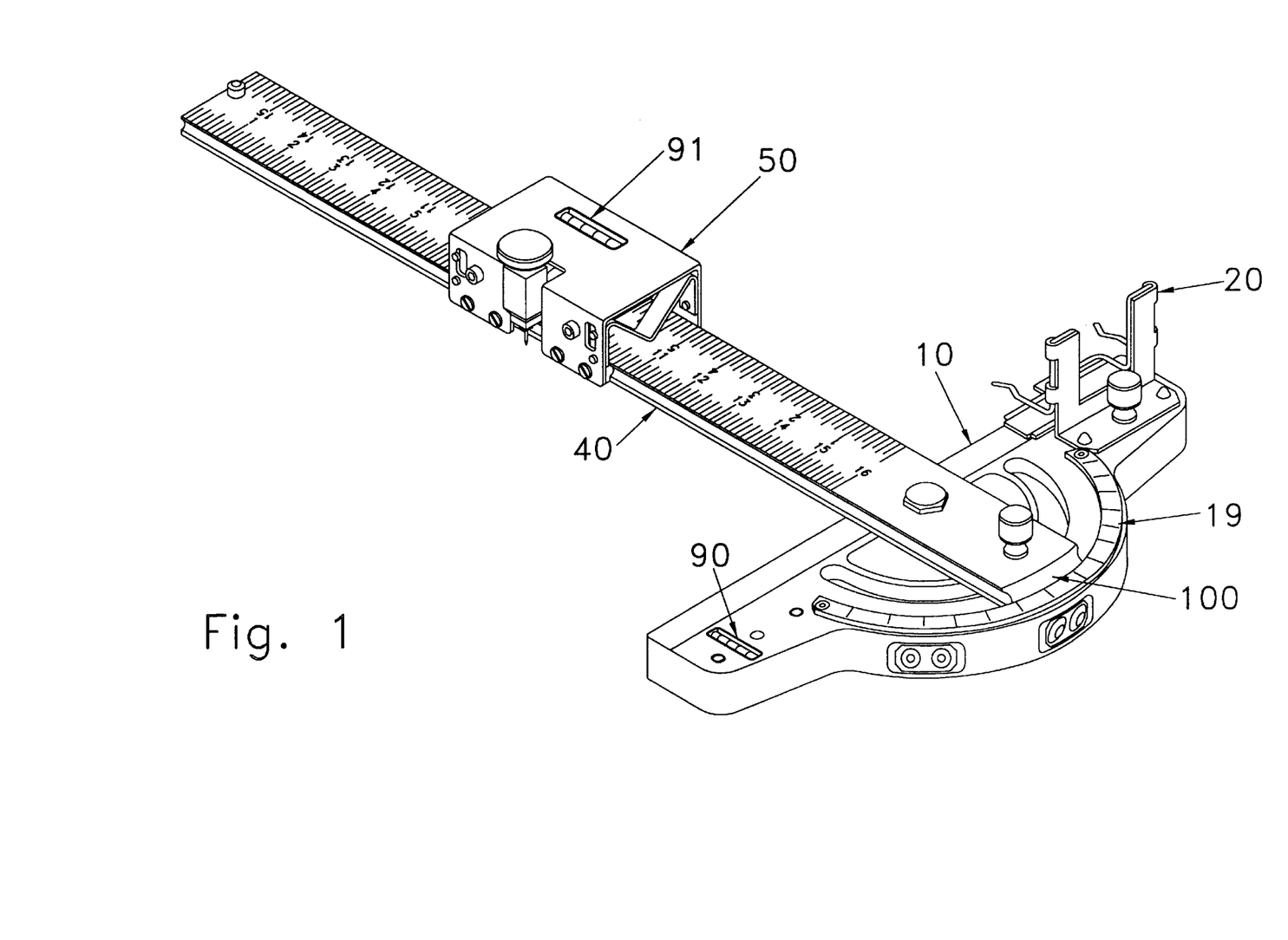
FIG. 1 is a perspective view of the preferred embodiment of the Mad Square Device.

FIG. 1 is the preferred embodiment of the Mad Square Device showing the multi-purpose tool in perspective form. The Mad Square Device of FIG. 1 has Blade 40 or horizontal straight edge segment scribed with two measuring rulers on both the top and bottom edges to measure the distance from either the Head 10 end of Blade 40 or the opposite end with a length of approximately 18 inches. The preferred embodiment of Blade 40 is approximately 18 inches in length for use on both small and large materials, but the specific lengths mentioned herein are not to be construed as limitations as certain carpentry applications have requirements for longer (48 inches for drywall and panelling) or shorter length blades in order to optimize the efficiency for the user.

Figures 2, 3:
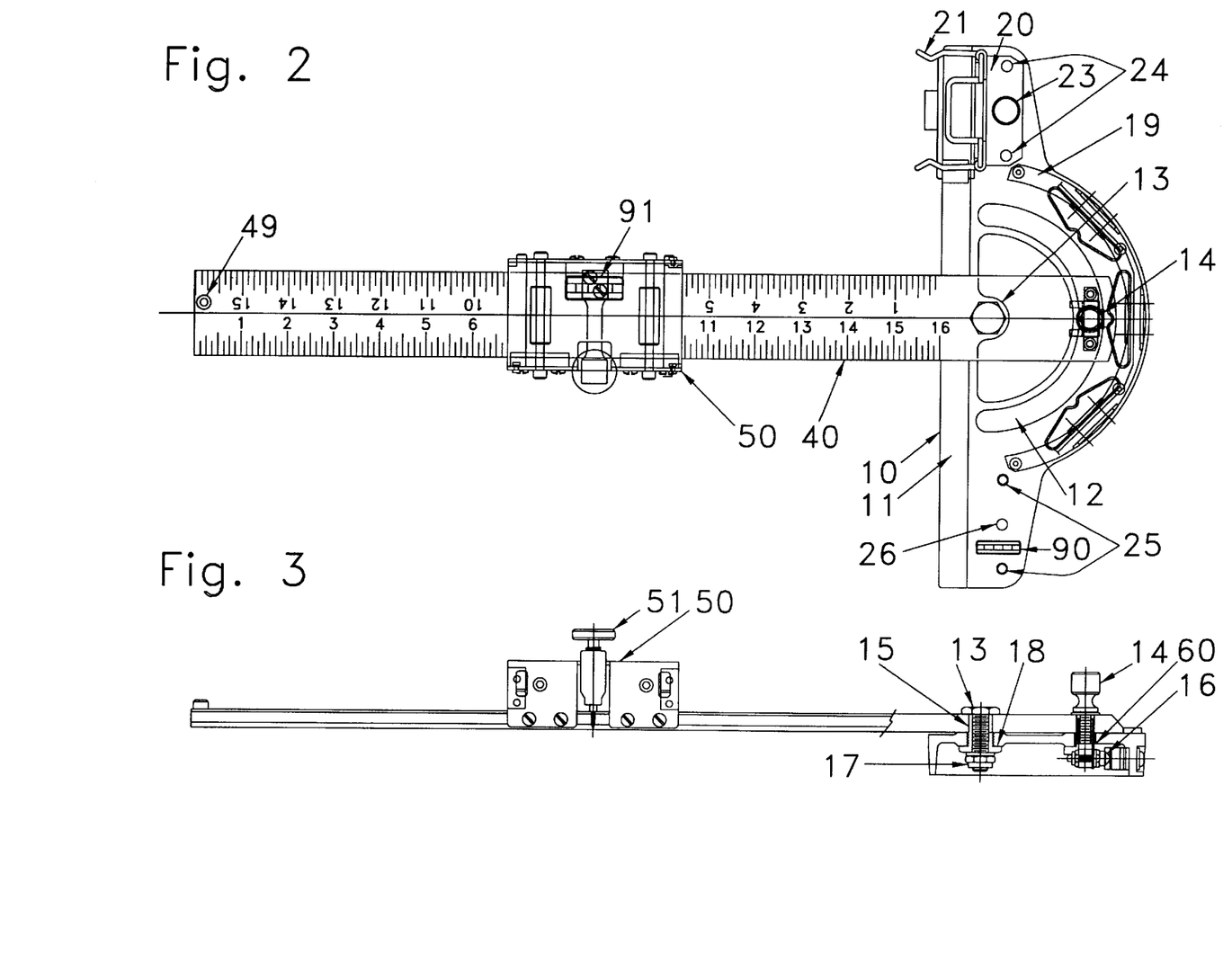
FIG. 2 is a top view of the Mad Square Device shown in FIG. 1.
FIG. 3 is a side view of the Mad Square Device shown in FIG. 1.

FIG. 2 shows a top view of the Mad Square Device with detachable Slide 50 reversibly and slidablly mounted on rotatable Blade 40 and Head 10 or vertical straight edge segment attached to the Blade by Pivot Bolt 13 and held in position by Thumb Screw 14 with the precise angle of rotation of Blade 40 shown on Protractor Scale 19. Retractable Measuring Tape 60 (shown in FIG. 7) can be affixed to the Mad Square Device by placement into Measuring Clip 21 attached to Measuring Tape Bracket 20. Measuring Tape Bracket 20 is affixed to Head 10 in the top position by sliding it over Positioning Guides 24 and Tightening Thumb Screw 23. Measuring Tape Bracket 20 can be removed from the top position by loosening Thumb Screw 23 and sliding it off Positioning Guides 24 and reinstalled on the bottom position of Head 10 by sliding it over Positioning Guides 25 and tightening Thumb Screw 23 in Threaded Hole 26. Threaded Slide Stop Screw 49 is affixed to Blade 40 to prevent Slide 50 from being inadvertently slid off of Blade 40 during use, but Slide 50 may be slidablly removed for cleaning or adjustment after removal of Threaded Slide Stop Screw 49. FIG. 2 also shows Level Assembly 91 which is flush mounted at the top surface of detachable Slide 50.

FIG. 2 shows a Protractor Scale 19 affixed to the surface of Head 10 and Base Line 100 scribed on Blade 40 so that rotation of Blade 40 results in the angle of rotation being shown by the matching point of Line 100 with the angle of Protractor Scale 19.

Figures 5, 6:
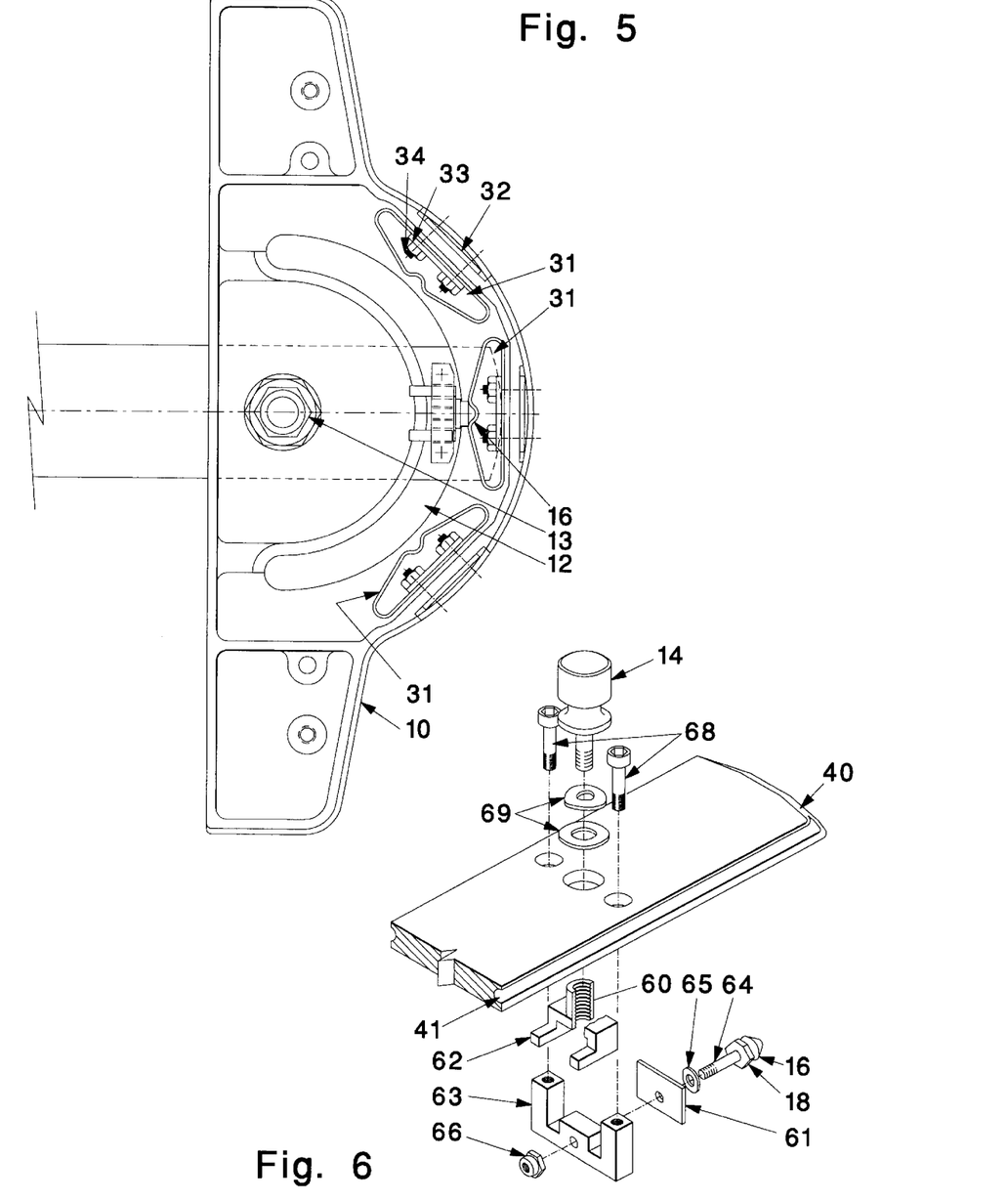
FIG. 5 is a partial bottom view rotated 90° of the Mad Square Device Head depicted in FIG. 2.
FIG. 6 is an exploded view of the Clamp Assembly depicted in FIG. 3.

FIG. 3 shows a side view of the Mad Square Device with Marker Back-up Screw 51 threaded into Marker Holder 52. FIG. 3 also shows the mounting of Blade 40 with Pivot Bolt 13 extended through Pivot Bushing 15 with Washer 18 held in position by Pivot Nut 17. The position of Blade 40 relative to Head 10 is affixed by tightening Thumb Screw 14. A detail drawing showing the attachment of Blade 40 to Head 10 by Clamp Assembly 60 is shown in FIG. 6.

Figure 4:
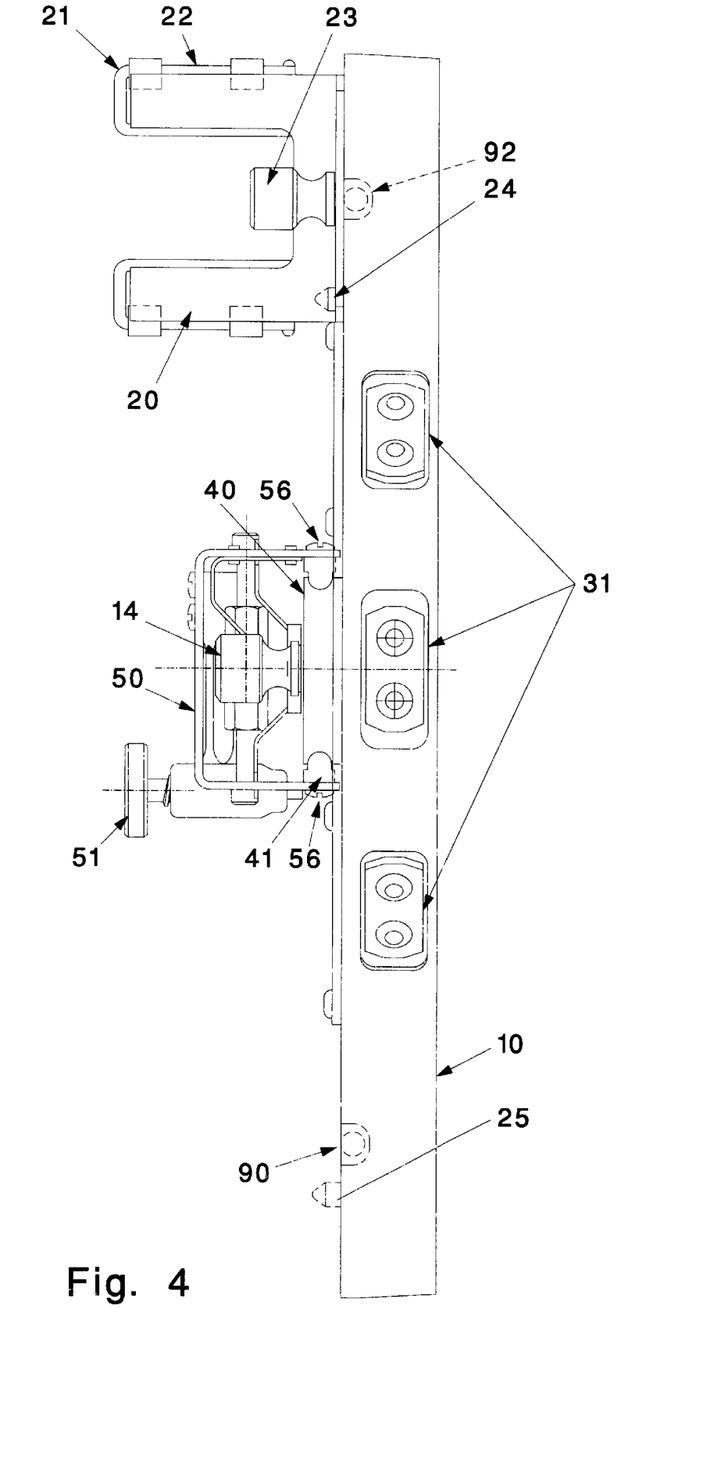
FIG. 4 is one end view of the Mad Square Device shown in FIG. 2 showing the measuring tape bracket.

FIG. 4 shows an end view of the Mad Square Device with Measuring Tape Bracket 20 attached to Head 10 in the top position with Measuring Tape Thumb Screw 23. Measuring Tape 60 (shown in FIG. 7) is held in position to Measuring Tape Bracket 20 by U-shaped Tape Bracket 22 with Tape Clip 21 which permits removal of the Measuring Tape 60 when a measuring tape is not required. Still another embodiment is to replace Measuring Tape 60 with an electronic distance meter (shown in FIG. 11) which measures distance by using an ultrasonic device.

Figures 7, 8:
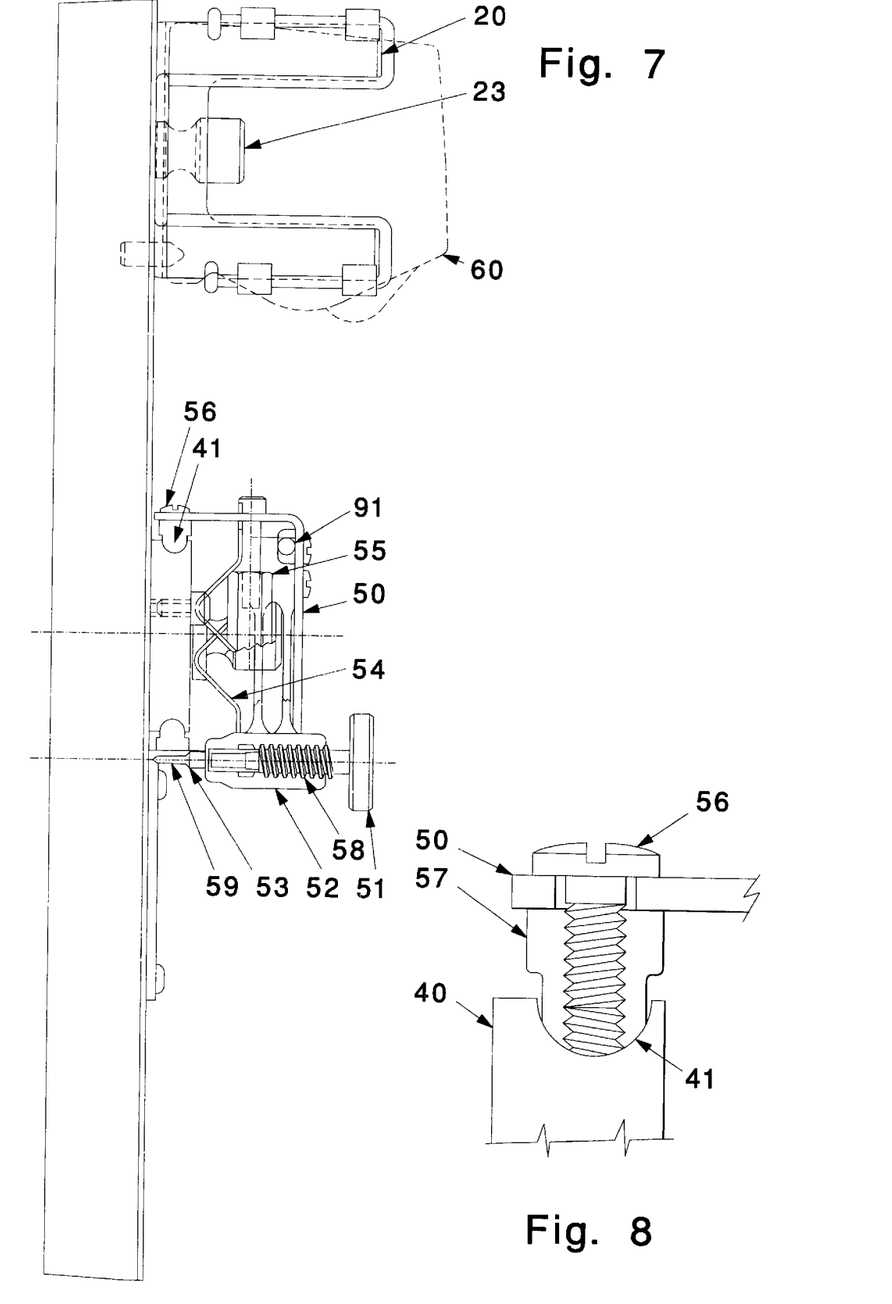
FIG. 7 is an end view of the Mad Square Device of the opposite end depicted in FIG. 4.
FIG. 8 is an exploded view of the slide bearing showing the attachment of the slide to the blade.

FIG. 4 also shows one view of the Slidable feature of Slide 50 which has a semi-circular Recess 41 along the entire length of Blade 40. Slide 50 is held in slidable position by Slide Adjusting Screws 56 affixed through Slide Bearings 57 located on each side of Slide 50 threaded into Blade 40. A detail drawing of this feature is shown in FIG. 8.

FIG. 4 shows two Level Assemblies 90 and 92 which are flush mounted at the top surface of the top and bottom of Head 10 under the top surface of Head 10 centered between the two Positioning Guides 24 at the top of Head 10 and centered between the two Positioning Guides 25 at the bottom of Head 10.

FIG. 5 is a partial bottom view of Head 10 rotated 90° from view of FIG. 2. Semi-circular Slot 12 is removed from Head for ease in rotation of Blade 40 with Thumb Screw 14 extending through Slot 12 into Knob Standoff 63. Detent 31 with Detent Knob 16 show the major position affixing feature of Adjustable Blade 40 of the Mad Square Device at 45° positive, 0°, and 45° negative. Blade 40 may be affixed at other angles with the precise angle shown on Protractor Scale 19.

Detent Knob 16 as seen in FIG. 5 may be adjusted by rotating either clockwise or counter-clockwise to properly tension fit against Detent 31 of Head 10 for proper rotation ot Blade 40 relative to Head 10 of the Mad Square Device. Each of three Detents 31 is held in position by Detent Screws 33 threaded through Head 10 into Detent Nuts 34.

FIG. 6 shows the Clamp Assembly 60 by which Blade 40 is attached and held in rotatable position to the Head 10. Two Clamp Assembly Shoulder Screws 68 are threaded through Blade 40 into Knob Standoff 63. Thumb Screw 14 is threaded through two washers 69 and through Blade 40 into Clamp Nut 62 which is held in horizontal position by Clamp Nut Guide Plate 61 attached to Knob Standoff 63 by Clamp Adjusting Screw 64. Clamp Adjusting Screw 64 is threaded through Washer 65 into Lock Nut 66 with Clamp Nut 18 Adjusting Nut and Detent Knob 16 at the opposite end of Clamp Adjusting Screw 64.

FIG. 7 shows an end view ot the device at the opposite end depicted in FIG. 4. Measuring Tape Bracket 20 which holds Measuring Tape 60 in position is affixed to Head 10 by Thumb Screw 14. Slide 50 housing the marking device and Level 91 is attached to Blade 40, as shown in FIG. 7, and as described above by Adjusting Screws 56 located on each side of Slide 50 into the semi-circular Recess 41 along the length of Blade 40. The marking device can be adjusted by turning Marker Back-up Screw 51 clockwise or counter-clockwise in the threads of Marker Holder 52 to apply or release tension on the Adjusting Spring 58 which is abutted to Lead Holder 53 holding Pencil Lead 59. Slide Retainer 54 provides rigidity and maintains the vertical spacing of the top surface of Slide 50 relative to Blade 40. Coupler Nuts 55 are tightened or loosened to maintain proper horizontal tension of Slide 50.

FIG. 8 shows an exploded view of the attachment of the detachable Slide 50 to Blade 40 as described above.

Figure 9:
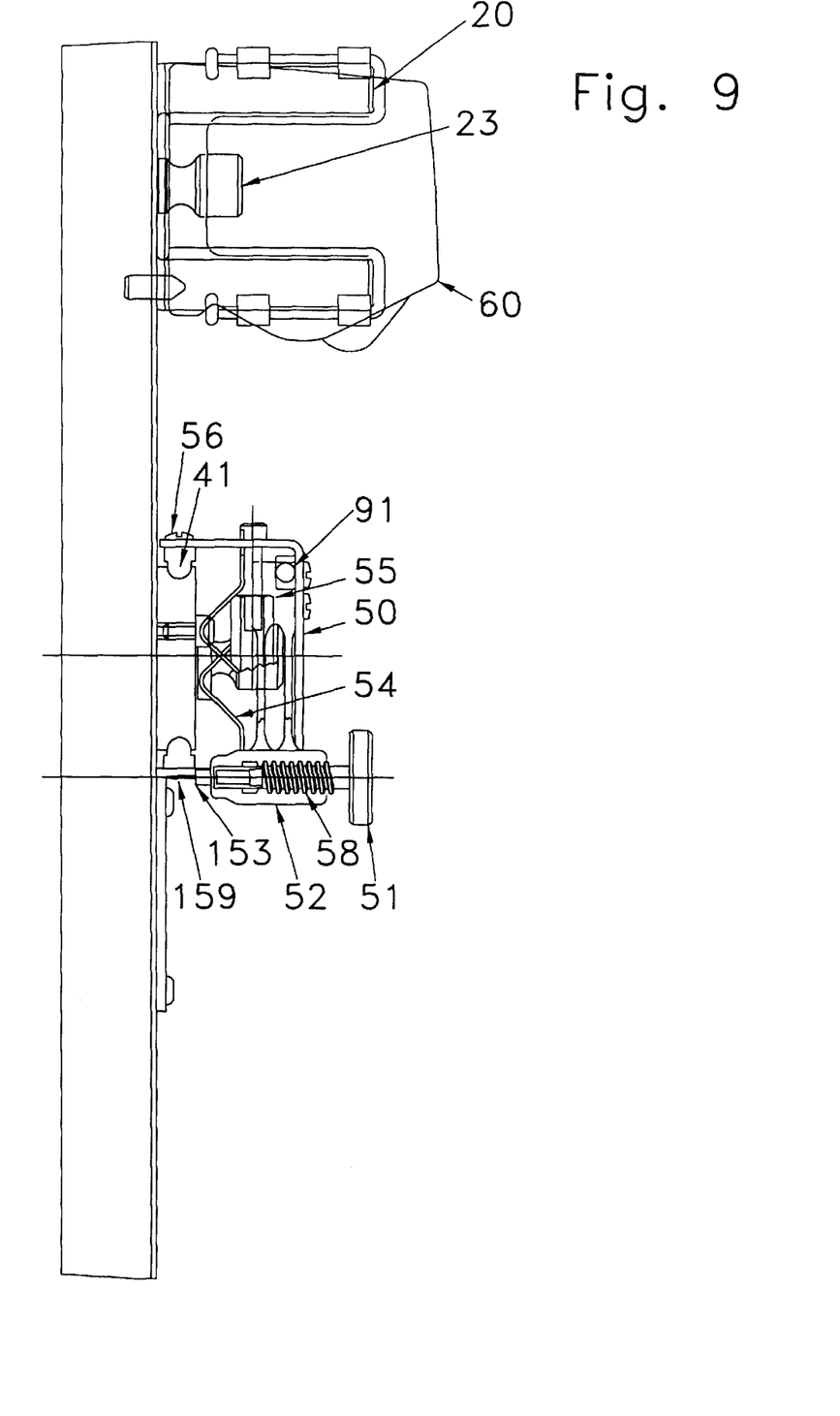
FIG. 9 is the same end view of the Mad Square Device as FIG. 7 showing an alternate embodiment of a cutting blade device.

FIG. 9 shows an end view of the device at the opposite end depicted in FIG. 4 and the same view as depicted in FIG. 7 with the Lead Holder 53 holding Pencil Lead 59 being replaced with Blade Holder 153 holding Blade 159. This alternative embodiment is usually associated with use of the Mad Square Device with drywall or like material and this embodiment can be used with a replaceable longer length Blade 40 as described above.

Operation of this invention in alternate embodiments can be visualized by viewing FIG. 1 in which the rotatable straight edge blade may be of different lengths depending upon the specific carpentry project. Replacement of one straight edge blade with a straight edge of another length, either shorter or longer, is easily accomplished because of the modular construction of each of the components attached wherein the device may be disassembled and reassembled. Further replacement of Lead Holder 53 and Pencil Lead 59 with Blade Holder 153 holding Blade 159 is desirable if drywall or like material is to be cut.

Figure 10:
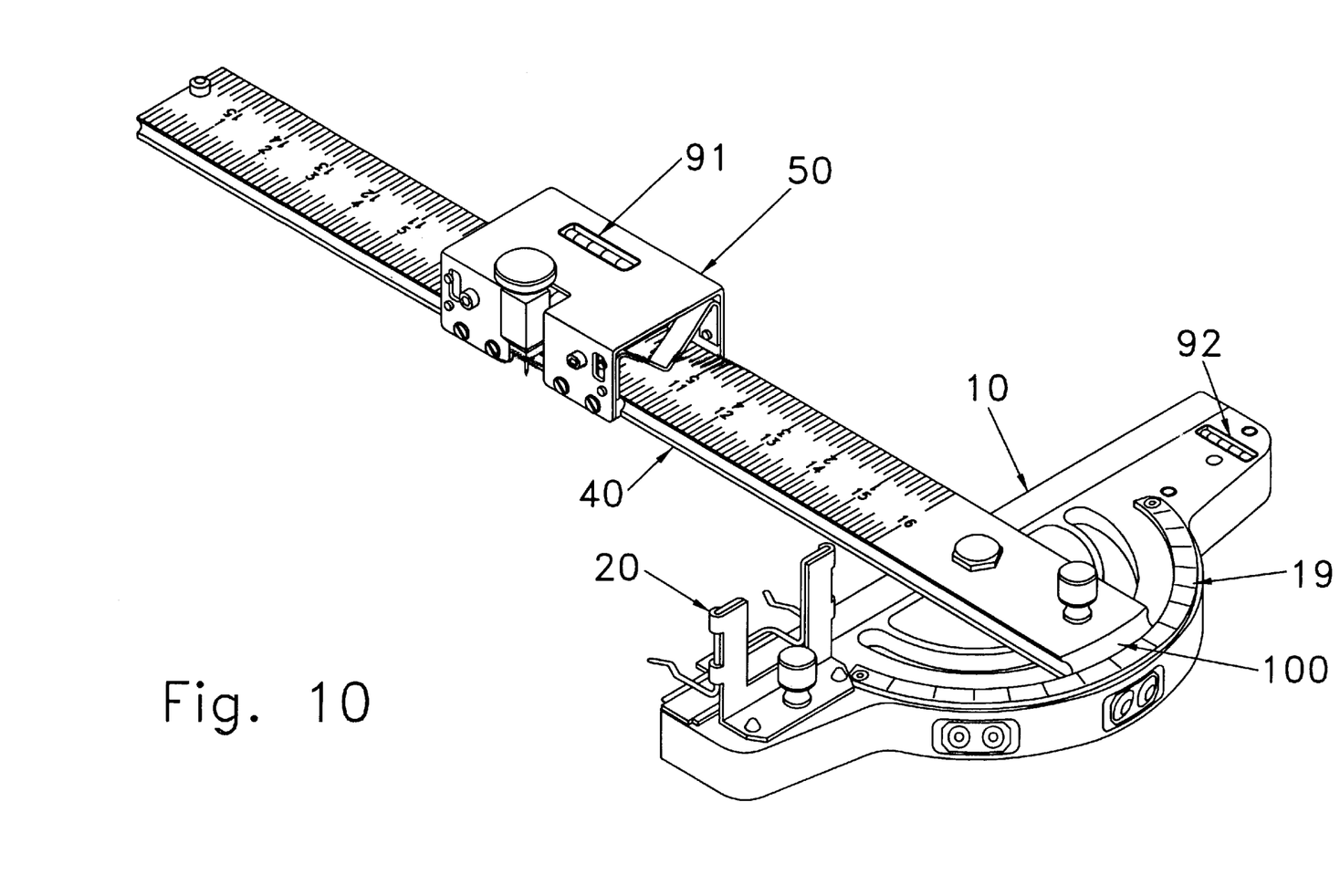
FIG. 10 is a perspective view of the device showing the measuring tape bracket at the opposite end of the device.
Figure 11:
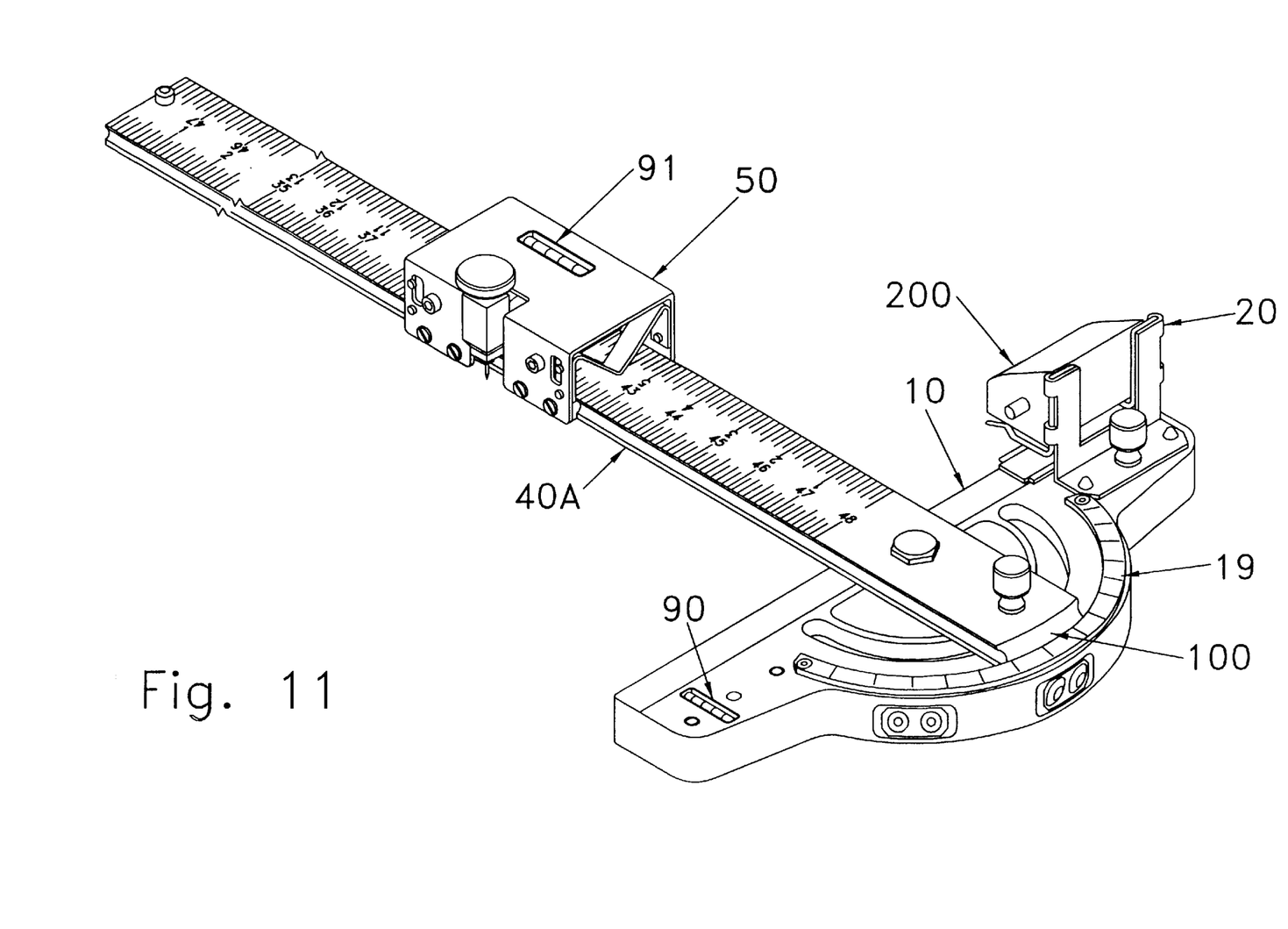
FIG. 11 is a perspective view of the device showing an alternate embodiment with a longer length blade and an electronic distance meter.
Figure 12:
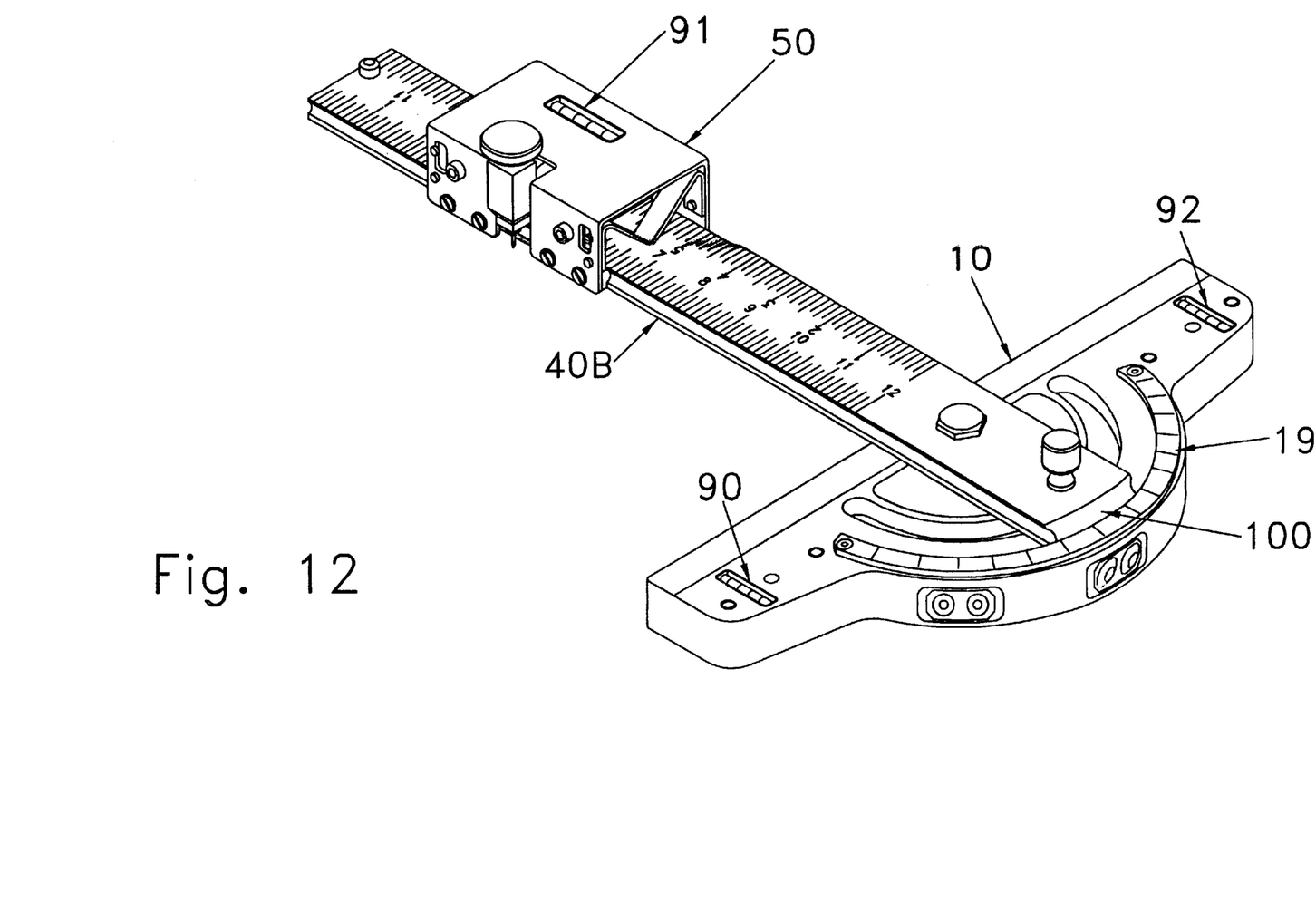
FIG. 12 is a perspective view of the device showing an alternate embodiment with a shorter length blade and the measuring tape bracket removed.

An alternate embodiment of this invention is shown by viewing FIG. 11 in which the straight edge blade depicted is 48 inches in length for use with drywall projects. An alternate embodiment is shown in FIG. 12 in which the straight edge blade depicted is 12 inches in length for use on carpentry projects where ease of handling is important. FIG. 10 also shows flush mounted Level 92 at the top position on Head 10 with Measuring Tape Bracket 20 affixed to Head 10 in the bottom position by Thumb Screw 23. FIG. 12 shows Bracket 20 removed exposing flush mounted Level 92 at the top position on Head 10 and flush mounted Level 90 at the bottom position on Head 10. FIG. 11 shows Electronic Distance Meter 200 held in position by Bracket 20 which is affixed to Head 10 by Thumb Screw 23.

Thus while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein including, but not limited to, variations in size, materials, shape, form, function, and manner of operation, assembly and use.

The proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of the specification is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by letters of patent of the united states is as follows:

1. A combination of a rotatable straight edge with measuring rules scribed on each parallel edge of the straight edge, marking device, tape measure, and a plurality of level apparatus comprising:

A horizontal straight edge segment which includes an outer edge and an inner edge and which a predetermined length horizontal straight edge segment is rotatably attached to a vertical straight edge segment, a slidable marking device, which accepts replaceable lead points, a tape measure assembly which includes a bracket affixing a detachable measuring tape, and a level assembly positioned on the slidable marking device, wherein said apparatus may be disassembled into components and reassembled.

2. A device in accordance with claim 1 in which a plurality of level assemblies are positioned on the vertical straight edge segment and flush mounted beneath the surface of the said vertical straight edge segment.

3. A device in accordance with claim 1 in which the horizontal straight edge segment is replaced with a longer length horizontal straight edge segment than is used in the preferred embodiment.

4. A device in accordance with claim 1 in which the horizontal straight edge segment is replaced with a shorter length horizontal straight edge segment than is used in the preferred embodiment.

5. A device in accordance with claim 1 in which the slidable marking device has an adjustable spring-loaded marker holder to accept replacement lead points.

6. A device as claimed in claim 1 in which the slidable marking device is replaced with a means for cutting materials.

7. A device as claimed in claim 1 in which the tape measure device is replaced with an electronic distance meter device.

8. A combination hand tool device comprising a rotable straight edge, marking device, tape measure, and a plurality of level apparatus comprising:

A straight edge segment having an outer edge and an inner edge, scribed with measuring rules on the parallel outer edge and the inner edge, and said straight edge segment is of a predetermined length in a horizontal and rotatable position relative to an attached vertical straight edge segment, a slidable marking device reversibility attached to the said horizontal straight edge segment having an adjustable spring loaded marker holder to accept replaceable lead points, a tape measure assembly with a bracket to affix a measuring tape to said tape measure assembly which is detachably affixed to the vertical straight edge segment; a level assembly positioned on the slidable marking device, a plurality of level assemblies mounted and positioned on the said vertical straight edge segment beneath the surface mounting of the tape measure assembly, wherein the said device may be disassembled and reassembled.

9. A device in accordance with claim 8 in which the horizontal straight edge segment is replaced with a longer straight edge segment than is used with the preferred embodiment.

10. A device in accordance with claim 8 in which the horizontal straight edge segment is replaced with a shorter length horizontal straight edge segment than the preferred embodiment.

11. A device as claimed in claim 8 in which the slidable marking device is replaced with a cutting blade and holder for said cutting blade.

12. A device as claimed in claim 8 in which the tape measure is replaced with an electronic distance meter.

13. A method for measuring and marking wood or like materials with a combination hand tool device comprising the steps of: providing an apparatus with a horizontal straight edge segment having an inner edge and an outer edge scribed with measuring rules with a means of rotatable attachment of said straight edge to a vertical straight edge segment, a slidable replaceable marking device attached in reversible position to the horizontal straight edge segment having an adjustable replaceable spring loaded marker device to accept replaceable lead points and marking the material along the length of the inner or outer edge of the horizontal straight edge segment, a tape measure apparatus with a bracket affixing a detachable retractable tape measure with a means of detachably affixing the said tape measure apparatus to the vertical straight edge segment and measuring the material, a level assembly attached to the slidable marking device, and a plurality of level assemblies with a means for mounting said level assemblies to the vertical straight edge segment, wherein the said combination tool device may be disassembled into components and reassembled; using said apparatus to measure and mark said wood or like materials.

14. A method as claimed in claim 13 in which the slidable marking device is replaced with a means for cutting materials.

15. A method as claimed in claim 13 in which the tape measure apparatus is replaced with an electronic distance measuring apparatus.

\* \* \* \* \*